Sept. 24, 1957 G. J. HEBENHEIMER 2,807,046
SAWING AND CUTTING MACHINES
Filed May 13, 1955 4 Sheets-Sheet 1

George J. Hebenheimer
INVENTOR.

Sept. 24, 1957  G. J. HEBENHEIMER  2,807,046
SAWING AND CUTTING MACHINES
Filed May 13, 1955  4 Sheets-Sheet 2
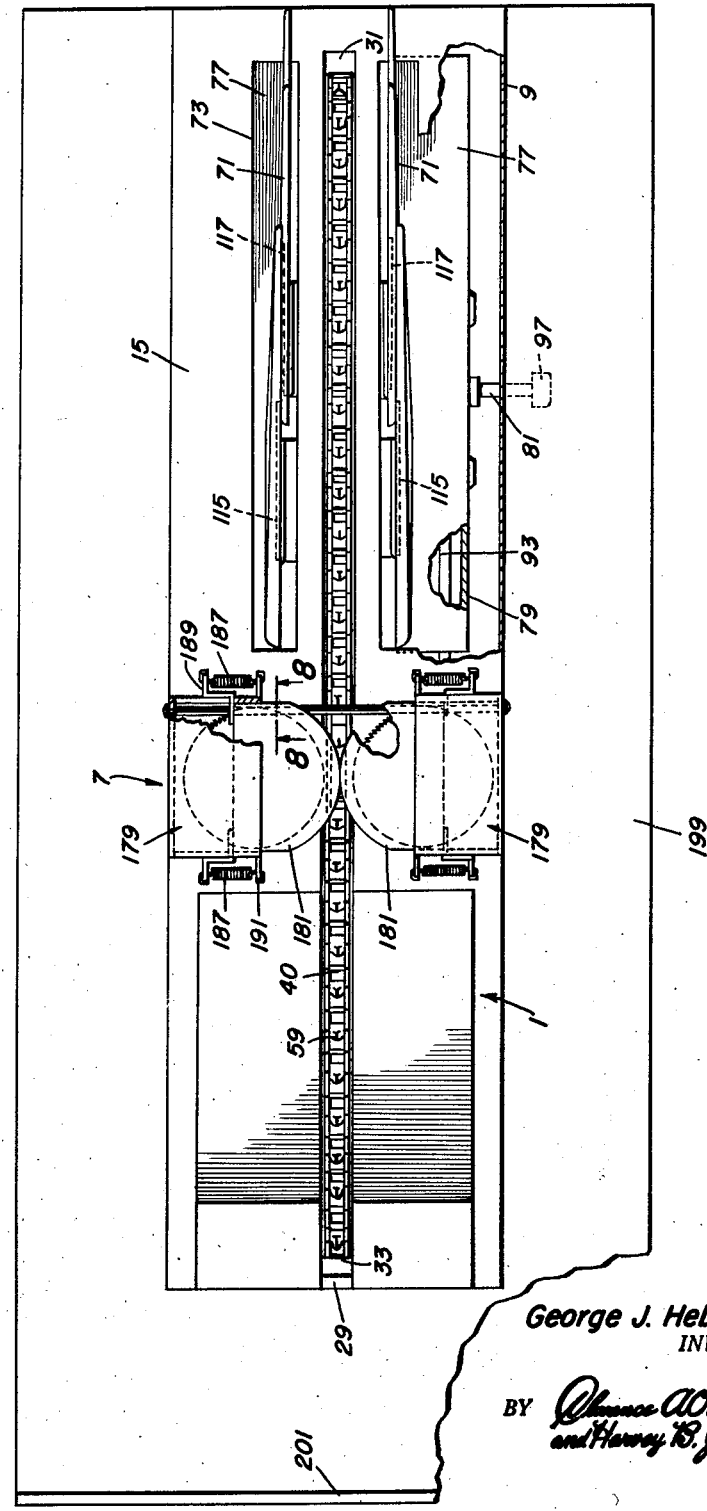
George J. Hebenheimer
INVENTOR.

Sept. 24, 1957 G. J. HEBENHEIMER 2,807,046
SAWING AND CUTTING MACHINES
Filed May 13, 1955 4 Sheets-Sheet 3

George J. Hebenheimer
INVENTOR.

BY
Attorneys

Sept. 24, 1957 G. J. HEBENHEIMER 2,807,046
SAWING AND CUTTING MACHINES
Filed May 13, 1955 4 Sheets-Sheet 4
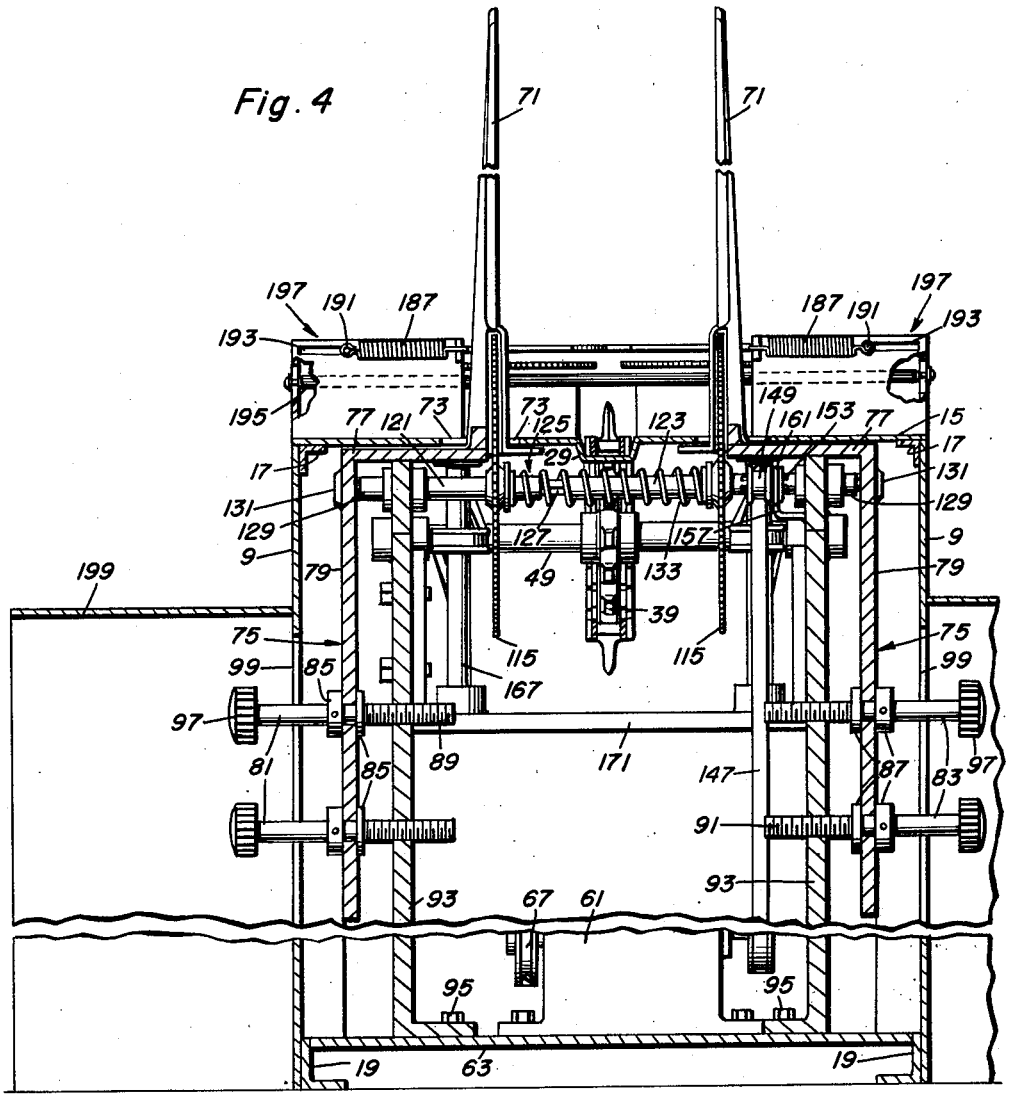
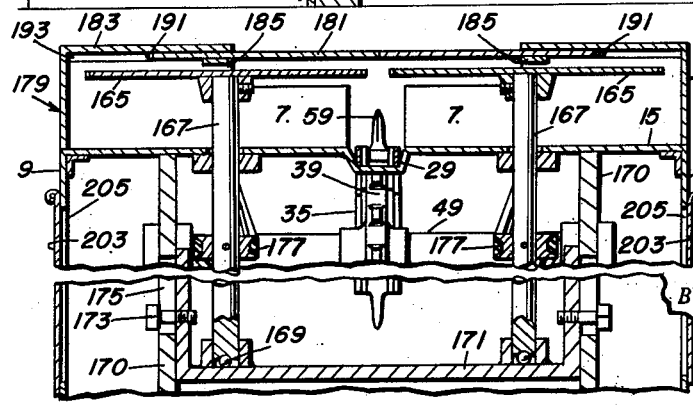
George J. Hebenheimer
INVENTOR.

2,807,046
SAWING AND CUTTING MACHINES

George J. Hebenheimer, East Alton, Ill.

Application May 13, 1955, Serial No. 508,060

5 Claims. (Cl. 17—11)

My invention relates to improvements in sawing and cutting machines for cutting up the carcasses of chickens.

The primary object of my invention is to provide a machine for quickly and cleanly severing the legs and wings of carcasses of chickens and cutting of the breast.

Another object is to provide in such a machine for cleanly severing the legs at the thigh joints and the wings at the joints to the trunk of the carcass.

Another object is to provide for cutting through the meat around the thigh and wing joints so as to obviate tearing the flesh and to then cut through the joints by sawing.

Another object is to provide for cutting through the meat around the joints of both thighs and wings simultaneously and for sawing through the thigh and wing joints simultaneously.

Yet another object is to provide for cutting off the breast at both sides of the trunk simultaneously by sawing.

Other ancillary objects together with the precise nature of my improvements will become readily apparent when the following description and claims are read with reference to the accompanying drawings in which:

Figure 2 is an enlarged view in plan partly broken away;

Figure 4 is a further enlarged view in vertical transverse section taken on the line 4—4 of Figure 3;

Figure 6 is a fragmentary enlarged view in vertical transverse section partly broken away and taken on the line 6—6 of Figure 3;

Figure 1:
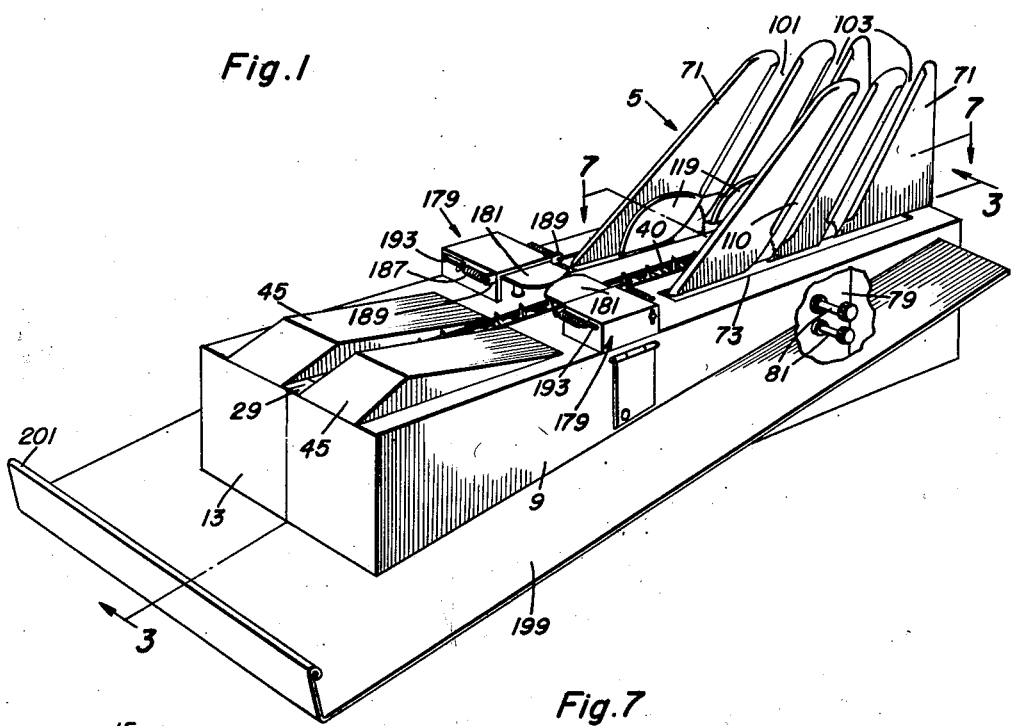
Figure 1 is a perspective view of my improved machine in the preferred embodiment thereof.

Referring to the drawings by numerals the machine of my invention comprises as its basic components, a base, a conveyor, leg and wing severing means, and breast severing means, and which are designated generally 1, 3, 5, 7 respectively.

The base 1 is of rectangular shape and hollow with sides 9, ends 11, 13, a top 15, upper and lower longitudinal angle bars 17, 19, the upper bars 17 having the top 15 suitably fixed thereon, transverse lower angle bars 21, 22 at the ends 11, 13 and corner uprights 25, 27 at said ends 11, 13 respectively. The top 15 is formed with a longitudinal central trough 29 provided adjacent the ends 11, 13 with slots 31, 33, respectively, for a purpose presently seen.

The conveyor 3 comprises a sprocket chain 35 trained over sprocket wheels 37, 39 adjacent the ends 11, 13 of the base 1 with its upper run 40 adapted to travel in the trough 29 and through the slots 31, 33 to convey a chicken carcass, shown in broken lines at 41, from the leg and wing severing means 5 to the breast severing means 7 and to feed the dismembered trunk up inclined ramps 45 on the top 15 at opposite sides of the trough 29 at the end 13 hereinafter termed the discharge end.

The sprocket wheels 37, 39 are suitably fixed on transverse shafts 47, 49 in the base 1 adjacent the ends 11, 13 journaled in side uprights, as at 51, 53, in the base 1 rising from transverse channel beams 55, 57 cross connecting the angle bars 19. Suitable spikes or spurs 59 are provided on the sprocket chain 35 for inpaling a chicken carcass 41 thereon and which are adapted to extend above the top 15.

The conveyor 3 is driven by means of an electric motor 61 mounted on a platform 63 in the base 1 adjacent the loading end 11, a suitable speed reducing transmission 65 also mounted on said platform, a belt and pulley drive 67 from the motor 61 to the transmission, and a sprocket and chain drive 69 from the transmission to the shaft 47 of the sprocket wheel 37. As will be clear the upper run 40 of the sprocket chain 35 travels toward the discharge end 13 of the base 1 and to and past the breast severing means 7.

The leg and wing severing means 5 comprises a pair of upright, opposite squeeze plates 71 at opposite sides of the sprocket chain 35 for holding a chicken carcass 41 therebetween over said chain. The squeeze plates 71 extend upwardly through slots 73 in the top 15 for relative lateral adjustment to hold carcasses 41 of different sizes between said plates.

Means for laterally adjusting the squeeze plates 71 comprises a pair of brackets 75 of inverted L-shape within the base 1 at opposite sides thereof and including horizontal top flanges 77 beneath and adjacent the top 15 and vertical sides 79. The plates 71 rise from and are preferably formed integrally with the flanges 77 at terminal edges thereof. A pair of upper and lower horizontal adjusting screws 81, 83 extend through the flanges 79 of the brackets 75 with collars 85, 87 thereon on opposite sides of said flanges and support said brackets. The pairs of screws 81, 83 are threaded at their inner ends, as at 89, 91 through upright plates 93 in the base 1, a pair of which rise from the platform 63 at opposite sides of said base 1 between the flanges 79 and are bolted, as at 95, to said platform. The outer head ends 97 of the bolts 81, 83 extend outwardly through slots 99 in the sides 9 for access to adjust said bolts.

The squeeze plates 71 are disposed parallel to the conveyor chain 35 and are each provided with two upright slots 101, 103 spaced longitudinally of the base 1, and which are open at their upper ends, provided with longitudinal sharp, parallel, cutting edges 105, 107 and incline downwardly toward the discharge end 13 of the base 1.

Figure 7:
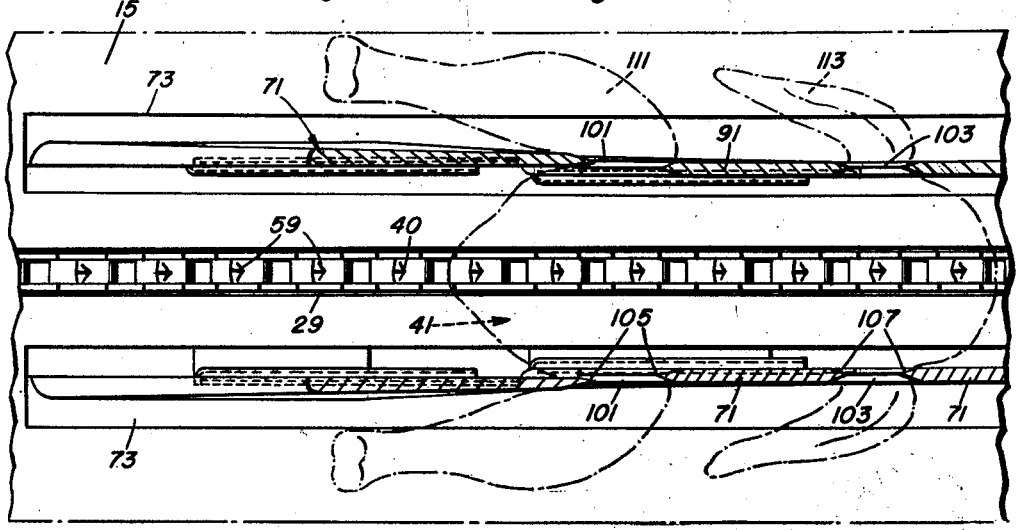
Figure 7 is a fragmentary enlarged view in horizontal section taken on the line 7—7 of Figure 1, and shown partly in broken lines.
Figure 8:
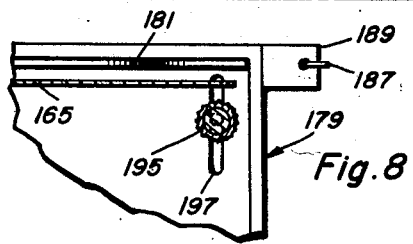
Figure 8 is a fragmentary enlarged view in vertical transverse section taken on the line 8—8 of Figure 2.
Figure 3:
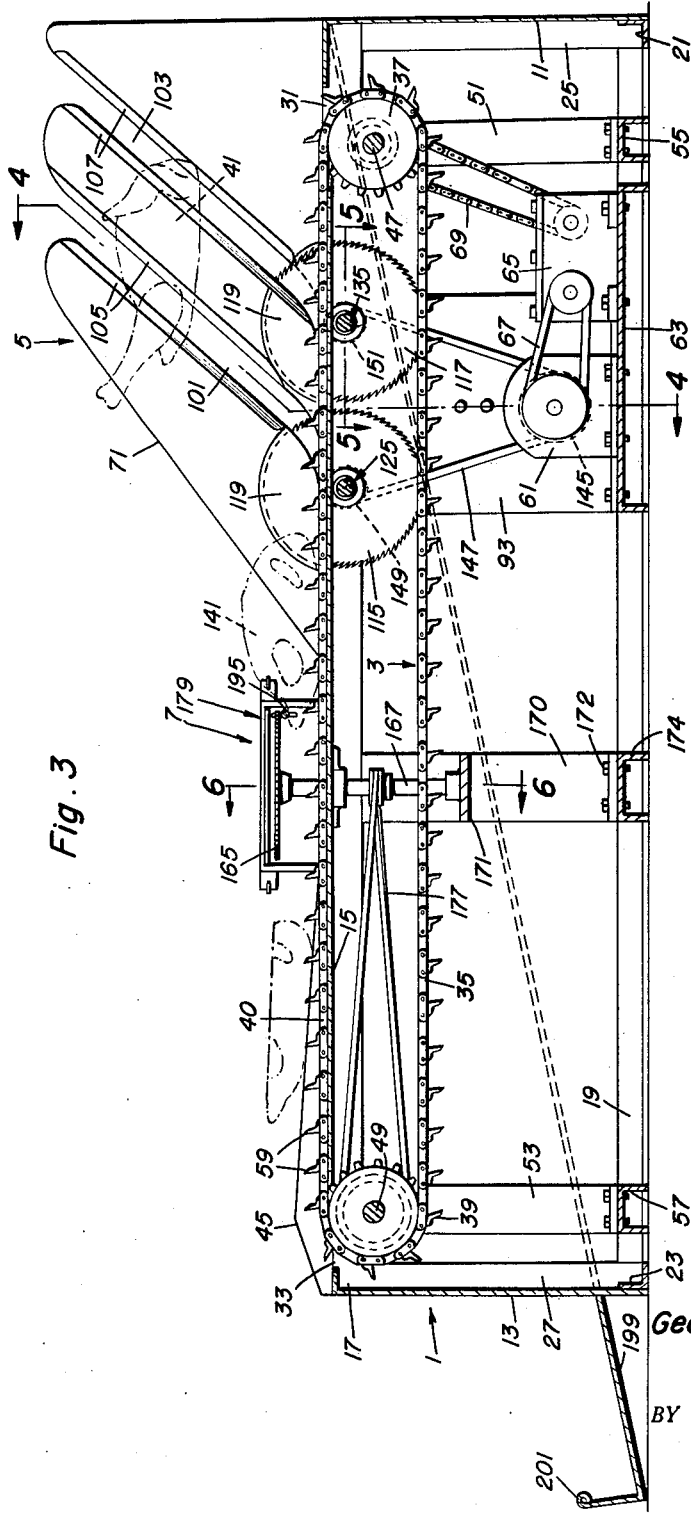
Figure 3 is an enlarged view in vertical longitudinal section taken on the line 3—3 of Figure 1.

The slots 101 and the slots 103 form opposite pairs for straddling the leg and wing joints of a chicken carcass 41 shoved downwardly between the squeeze plates 71 back lowermost and with the tail end facing the discharge end 13 of the base 1 and the legs 111, and the wings 113 at the outer sides of said plates 71, as shown in broken lines in Figure 7, and the cutting edges 105, 109 are designed to cut the meat at opposite sides of the joints away from the joints as the carcass 41 is shoved down between the squeeze plates 71. As also shown in Figure 7, the squeeze plates 71 may be of irregular cross section to accommodate the different thicknesses of the carcass 41 between the leg and wing joints.

The leg and wing severing means 5 further comprises vertical circular saws at the bottoms of the slots 101, 103, and alongside the squeeze plates 71, at the inner sides of said plates 71, for cutting through and severing the thigh joints and the wing joints there being a pair of lateral spaced saws 115 for the slots 101 and a similar pair 117 for the slots 103 and which overlap the bottoms of said slots 101, 103 and are driven downwardly of said bottoms by means presently described, for obvious reasons. The upper edge portions of the saws 115, 117 run between and are straddled by the lower portions of the squeeze plates 71 and depending saw guards 119 on said plates formed on said plates 71 preferably. The pairs of saws 115, 117 are spaced longitudinally of the base 1.

The pairs of saws 115, 117 are mounted for rotation and lateral adjustment. For this purpose, the pair of saws 115 is fixed on complemental sections 121, 123 of a cross shaft 125 in the frame 1 beneath the top 15 journaled in the plates 93. A spline connection 127 between said sections 121, 123 provides for relative endwise adjustment of said sections and unitary rotation thereof as the saws 115 are adjusted laterally.

Figure 5:
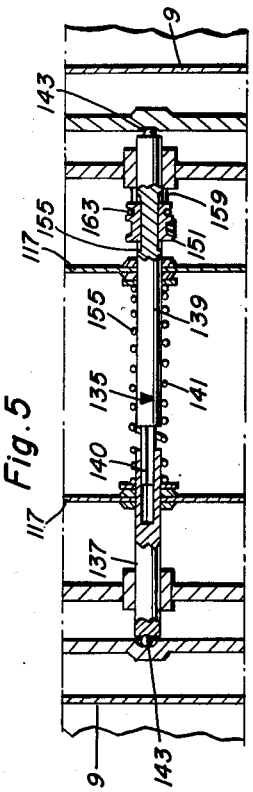
Figure 5 is a fragmentary enlarged view in horizontal section taken on the line 5—5 of Figure 3.

The outer ends 129 of the shaft sections 121, 123 are engaged by end thrust bearings 131 on the flanges 79 of the brackets 93 so that when said brackets 93 are adjusted by the screws 81, 83 toward each other to correspondingly adjust the squeeze plates 71, shaft sections 121, 123 and saws 115 will be correspondingly adjusted. A coil spring 133 on the shaft sections 121, 123 between the saws 115 adjusts the shaft sections 121, 123 and saws 115 away from each other when the brackets 93 are adjusted away from each other to correspondingly adjust the squeeze plates 71. The pair of saws 117 is mounted for rotation and lateral adjustment by means identical with that described for mounting and adjusting the saws 115, and best shown in Figure 5, 135 designating the shaft, 137, 139 the shaft sections, 140 the spline connection, 141 the spring and 143 the end thrust bearings.

The shafts 125, 135 are driven by the motor 61 through a pulley 145 on the motor shaft, and a belt 147 trained around said pulley 145 and over pulleys 149, 151 on one end of the shafts 125, 135. The pulleys 149, 151 are splined on the shafts 125, 135 as at 153, 155 for driving said shafts in any adjustment of the shaft sections 121, 123, 137, 139 and are held against lateral movement by fixed keepers 157, 159 engaging grooves 161, 163 in the pulleys 149, 151. The shafts 125, 135 rotate the saws 115, 117 faster than the speed of travel of the upper run 40 of sprocket chain 35.

The breast severing means 7 is disposed between the leg and wing severing means 5 and the ramps 45 and comprises a pair of circular horizontal coplanar breast saws 165 spaced apart transversely of the top 15 equidistantly upon opposite sides of the longitudinal center of the top run 40 of the sprocket chain 35 a distance suitable to pass the average breastbone of a chicken therebetween. The breast saws 165 are fixed on the upper ends of a pair of vertical shafts 167 journaled through the top 15 with lower ends mounted in antifriction bearings 169 on an elongated U-shaped bracket 171 interposed horizontally between uprights 170 bolted as at 172 to a crossbar 174, in the base 1. Set bolts 173 in the ends of the bracket 171 extended through vertical slots 175 in the uprights 170 provide for vertically adjusting the bracket 171 to correspondingly adjust the shafts 167 for spacing the saws 165 above the top 15 and chain 35 to cut off the breast meat at opposite sides of the breastbone of the carcass 41.

A pair of belt and pulley drives 177 from the shaft 49 to the shafts 167 provide for drive of the breast saws 165 oppositely by said shaft 49 preferably at the speed of saws 115, 117 instead of the conveyor chain 35 and with confronting edges rotating oppositely to the direction of travel of the run 40, of the sprocket chain 35.

A pair of flat top breast saw housings 179 spaced apart upon opposite sides of the run 40 of the sprocket chain 35 and out of which the confronting edges of the breast saws 179 project are suitably fixed on the top 15 of the base 1. The spacing between the housings 179 is sufficient to permit the dismembered carcass 41 to pass between said housings 179 with a pelvic structure flattened to pass beneath the breast saws 165.

A pair of guard plates 181 for the breast saws 165 are slidably mounted horizontally in the tops of the housings 179 between said tops 183 and supporting bars 185 and over the breast saws 165 to extend out of confronting sides of said housings 179 over the confronting edges of said saws for protection purposes and to be slid into said housings by passage of the dismembered carcass 41 therebetween. Coil springs 187 connected to side lugs 189 on said housings 179 and to side lugs 191 on said plates 181 extending out of side slots 193 in said housings 179 yieldingly extend said guard plates 181 into abutting engagement.

A small corrugated rubber covered roller 195 extends transversely between the breast saw housings 179 beneath the breast saws 165 for depressing and flattening the pelvic structure of the trunk of the carcass 41 below the plane of the breast saws 165 as the dismembered carcass 41 is fed between said saws so that the latter may cut off the breast meat at opposite sides of the breastbone. The roller 195 is adjustably mounted at its ends in the backs of the breast saw housings 179 in any suitable manner for adjustment in vertical slots 197 in said backs to space the roller vertically from the upper run 40 of the sprocket chain 35 as occasion may require.

A shelf 199 extends outwardly along the sides 9 of the base 1 and outwardly of the discharge end 13 of said base with a terminal upturned flange 201 and inclines downwardly toward said end 13.

Suitably hinged flaps 203 cover openings 205 in the sides 9 through which access may be had to the set bolts 173.

Referring now to the operation of the machine with the motor 61 running a carcass 41 is shoved down between the squeeze plates 3, after suitable lateral adjustment of said plates, with the back of the carcass 41 lowermost, the tail end pointing in the direction of travel of the upper run 40 of the sprocket chain 35, and the slots 101, 103 straddling the thigh joints and wing joints so that the meat around said joints is cut loose from said joints all in the manner already described.

As the carcass 41 nears the bottoms of the slots 101, 103 the saws 115, 117 sever the thigh and wing joints and the trunk of the carcass 41 becomes impaled on the spikes of the upper run 40 which carries the dismembered trunk between the breast saw housings 179. The severed legs and wings 111, 113 fall onto the shelf 199 at the sides of the base 1 and slide thereon to the discharge end 13. As the tail end of the trunk of carcass 41 engages the roller 195 the pelvic structure is flattened so that as the trunk is carried past said roller the pelvic structure passes under the breast saws 165 which cut off the meat of the breast at both sides while the breastbone passes between said saws 165 and between the guard plates 181 and separates the latter. The severed breast meat falls out the housings 179 and off onto the shelf 199 at the sides of the base 1 to slide to the discharge end 13 for collection with the legs 111 and wings 113. As the trunk of the carcass 41 is carried past the breast severing saws 165 it rides up the ramps 45 and is thereby lifted free of the upper run 40 to fall from said ramps for collection with the other parts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a machine for sawing and cutting up the carcasses of chickens, an elongated hollow base having a top, pairs of laterally spaced rotary saws extending vertically through said top at one end of the base and spaced longitudinally of the base with the saws in each pair at opposite sides of the base for severing the legs and wings of carcasses at the joints to the trunk upon positioning of the trunk downwardly between the saws of the pairs, a pair of vertically slotted upright squeeze plates rising through and above said top at opposite sides thereof outwardly of and opposite said saws for guiding the carcasses downwardly between the saws and the leg and wing joints to the saws through said slots, an endless conveyor on said base extending longitudinally along said top for conveying the trunks past said saws, and a pair of ramps on said top at the other end of the base rising from said top at opposite sides of said conveyor for lifting the trunks off said conveyor in response to movement of the conveyor.

2. The combination of claim 1, said slots having parallel cutting edges straddling said joints to sever the meat at said joints in response to positioning of the trunk downwardly between said plates.

3. The combination of claim 1, and a pair of shelves at opposite sides of the base below said top for receiving the severed legs and wings and inclining toward one end of the base for gravity feed of the severed wings and legs to said end of the base.

4. The combination of claim 1 including brackets in said base below said top supporting said plates, and screw feed means supporting said brackets and operative to adjust the brackets laterally to correspondingly adjust said plates for receiving trunks of different thicknesses therebetween.

5. The combination of claim 4, and means in said base slidably mounting said saws for lateral adjustment in correspondence with adjustment of said plates, said plates being operatively connected to said saws to adjust said saws.

References Cited in the file of this patent

UNITED STATES PATENTS

| | | |
|---|---|---|
| 1,943,077 | Jansen | Jan. 9, 1934 |
| 2,108,951 | Thompson | Feb. 22, 1938 |
| 2,110,416 | David et al. | Mar. 8, 1938 |
| 2,169,951 | Hannan | Aug. 15, 1939 |
| 2,605,496 | Spang | Aug. 5, 1952 |